US011934123B2

(12) United States Patent
Kohama et al.

(10) Patent No.: US 11,934,123 B2
(45) Date of Patent: Mar. 19, 2024

(54) FIXING DEVICE AND IMAGE FORMING APPARATUS INCLUDING THE SAME

(71) Applicant: KYOCERA Document Solutions Inc., Osaka (JP)

(72) Inventors: Atsushi Kohama, Osaka (JP); Yuhiro Sakai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/759,002

(22) PCT Filed: Jan. 15, 2021

(86) PCT No.: PCT/JP2021/001291
§ 371 (c)(1),
(2) Date: Jul. 18, 2022

(87) PCT Pub. No.: WO2021/149616
PCT Pub. Date: Jul. 29, 2021

(65) Prior Publication Data

US 2023/0034177 A1 Feb. 2, 2023

(30) Foreign Application Priority Data

Jan. 24, 2020 (JP) ................................ 2020-009990

(51) Int. Cl.
*G03G 15/20* (2006.01)

(52) U.S. Cl.
CPC ..... *G03G 15/2039* (2013.01); *G03G 15/2053* (2013.01)

(58) Field of Classification Search
CPC .......... G03G 15/2017; G03G 15/2039; G03G 15/2053; G03G 2215/2003
See application file for complete search history.

(56) References Cited

U.S. PATENT DOCUMENTS

2007/0182798 A1* 8/2007 Makihira ............ H05B 3/0095 347/102
2016/0252856 A1* 9/2016 Suzuki .............. G03G 15/2053 399/329
2020/0183310 A1* 6/2020 Tanto ................ G03G 15/2053

FOREIGN PATENT DOCUMENTS

JP 2017-097143 A 6/2017

* cited by examiner

*Primary Examiner* — Thomas S Giampaolo, II
(74) *Attorney, Agent, or Firm* — Studebaker & Brackett PC

(57) ABSTRACT

A fixing device includes a fixing belt, a pressing roller and a heating part. The heating part includes a heater, a plurality of temperature sensors, a heater holding member and a sensor holding member. The sensor holding member holds the temperature sensors between the heater holding member and the sensor holding member. The heater holding member has observation holes through which the heater is exposed. The heater holding member has a guide part which positions the sensor holding member with respect to the heater holding member. The sensor holding member has an engagement part engaged with the guide part. The sensor holding member holds each of the temperature sensors at a position corresponding to each of the observation holes by engagement of the engagement part with the guide part.

8 Claims, 5 Drawing Sheets

FIXING DEVICE AND IMAGE FORMING APPARATUS INCLUDING THE SAME

TECHNICAL FIELD

The present invention relates to a fixing device and an image forming system.

BACKGROUND

A heating film type or a fixing belt type fixing device installed in an electrophotographic image forming apparatus is known. The fixing device disclosed in Patent Document 1 includes a fixing assembly which is a heating part, and a pressing roller which presses the fixing assembly to form a fixing nip area.

The fixing assembly includes a cylindrical fixing belt (a fixing film), a flat plate heater coming into contact with the inner surface of the fixing belt, a heater holder which holds the heater, and a metal stay which presses the heater holder and the heater toward a pressing roller. Further, the fixing assembly includes a thermistor as a temperature sensor for measuring a temperature of the heater.

The thermistor is disposed in the heater holder. Specifically, the thermistor is disposed so as to come into contact with one surface of the heater with a predetermined pressure through a through hole (an observation hole or a measurement hole) provided in the heater holder in order to accurately measure a temperature of the heater.

PRIOR ART DOCUMENTS

Patent Documents

Japanese Unexamined Patent Application Publication No. 2017-97143

SUMMARY OF THE INVENTION

Problems to be Solved by the Invention

The fixing device is used for fixing toner to sheets having various widths ("lateral width" perpendicular to the conveyance direction) such as B5 to A3. In this case, if the width of the passing sheet is narrower than the width of the heater, the temperature of the heater in the "non-sheet passing regions" at both ends in the sheet width direction, which is not involved in fixing the toner, may increase. The sheet width (the lateral width) direction is a direction parallel to the longitudinal direction or the axial (the rotational axis) direction of the pressing roller for fixing the toner in the fixing device.

To cope with this problem, in the fixing device, a plurality of stripe-shaped heaters or block-shaped heaters, having a relatively short length in the sheet width direction, are arranged in the sheet width direction (the axial direction of the pressing roller) so as to perform detailed temperature control in the sheet width direction.

However, in order to perform appropriate temperature control, one temperature sensor must be installed in each of the plurality of heaters, and the number of temperature sensors that are assembled into the heating part, which is also called a fixing assembly or a fixing unit, may increase. As a result, the assembly work of the heating part becomes complicated, and the cost of the whole fixing device increase due to the increase in the number of the work steps.

An object of the present invention is to provide a fixing device and an image forming apparatus capable of suppressing an increase in cost associated with an increase in the number of parts and the number of work steps.

Means of Solving the Problems

A fixing device of the present invention includes a fixing belt, a pressing roller and a heating part. The fixing belt has a pressing surface. The pressing roller comes into contact with the pressing surface. The heating part heats the fixing belt. The heating part includes: a heater extending in an axial direction of the pressing roller; a plurality of temperature sensors; a heater holding member which holds the heater so as to come into contact with a back surface of the pressing surface of the fixing belt; and a sensor holding member which holds the temperature sensors at intervals in the axial direction between the heater holding member and the sensor holding member. The heater has a first surface facing the heater holding member. The heater holding member has observation holes through which the first surface of the heater is exposed, at a plurality of positions separate from each other in the axial direction. The heater holding member has a guide part which positions the sensor holding member with respect to the heater holding member. The sensor holding member has an engagement part engaged with the guide part. The sensor holding member holds each of the temperature sensors at a position corresponding to each of the observation holes by engagement of the engagement part with the guide part.

An image forming apparatus of the present invention includes the fixing device and an image forming part which forms a toner image on a sheet. The fixing device fixes the toner image on the sheet.

Effects of the Invention

According to the present invention, it becomes possible to suppress an increase in cost associated with an increase in the number of parts and the number of work steps.

EMBODIMENT FOR CARRYING OUT THE INVENTION

Figure 1:
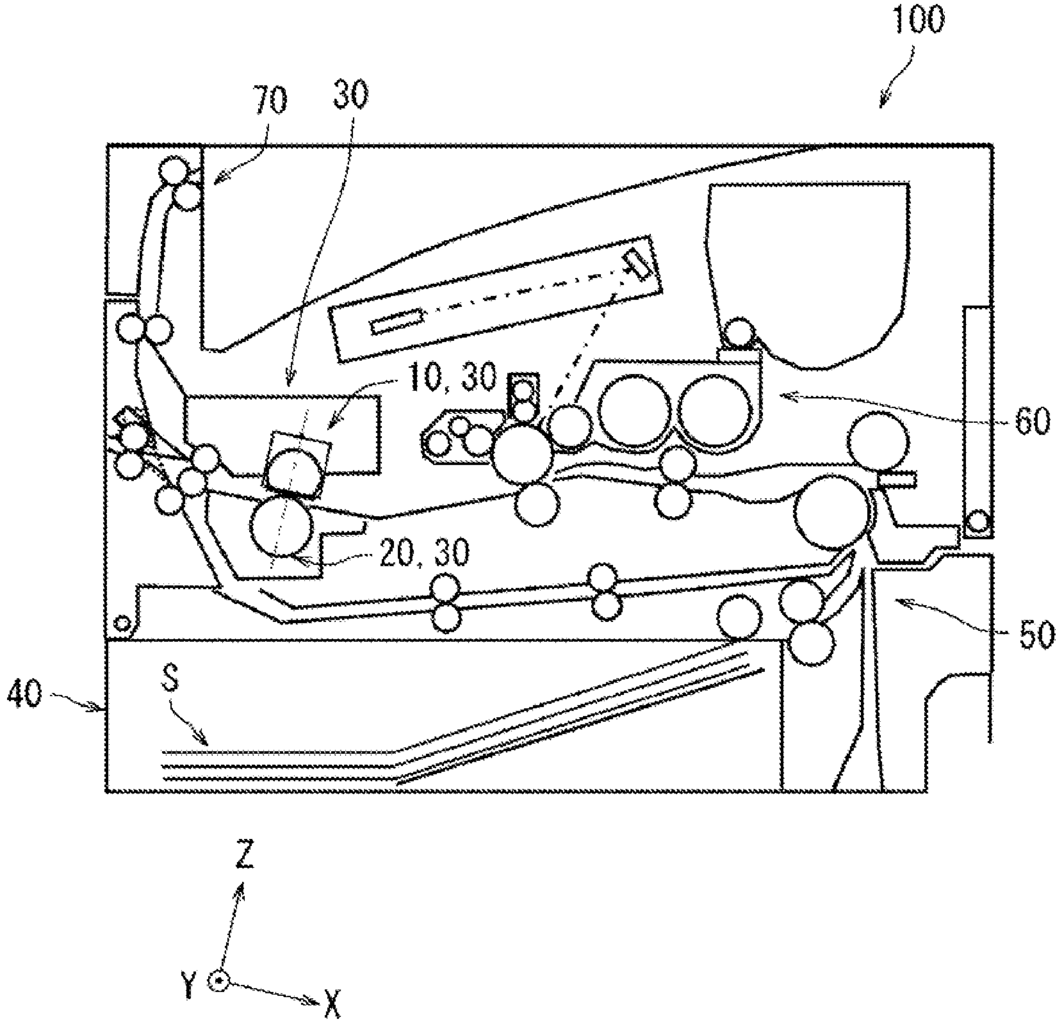
FIG. 1 is a view schematically showing a structure of an image forming apparatus including a fixing device according to one embodiment of the present invention.

Hereinafter, with reference to the drawings, one embodiment of the present invention will be described. In the drawings, the same reference numerals are attached to the same or corresponding parts, and the description thereof will not be repeated. The X axis, the Y axis and the Z axis, which are indicated as reference directions in the drawings, are three-dimensional orthogonal coordinates orthogonal to each other, and the Z axis is parallel to a pressing direction (a nip direction) of a pressing roller 20 which presses a heating unit 10 that is a heating part of a fixing device 30.

With reference to FIG. 1, a structure and an operation of an image forming apparatus 100 including the fixing device 30 will be described. FIG. 1 is a view showing the structure of the image forming apparatus 100 including the fixing device 30. The image forming apparatus 100 processes image data stored in a storage medium or image data transmitted from an external device to form an image on a sheet S. An image read from a document may be used as the image data.

The image forming apparatus 100 is a copying machine, a printer, a facsimile or a multifunctional peripheral having their functions, for example. Hereinafter, embodiments in which the image forming apparatus 100 is a monochrome printer will be described.

As shown in FIG. 1, the image forming apparatus 100 includes a sheet feeding part 40, a conveying part 50, an image forming part 60, the fixing device 30 and a discharging part 70.

The sheet feeding part 40 houses a plurality of the sheets S and feeds the sheet S to the conveying part 50 one by one. The sheet S is a paper sheet or a synthetic resin sheet, for example. The conveying part 50 includes a plurality of conveying rollers pairs, and conveys the sheet S fed from the sheet feeding part 40 to the discharging part 70 via the image forming part 60 and the fixing device 30.

The image forming part 60 forms a toner image on the sheet S in an electrophotographic method. Specifically, the image forming part 60 includes a photosensitive drum, a charging device, an exposure device, a developing device, a replenishing device, a transferring device, a cleaning device and a charge elimination device.

The charging device charges the photosensitive drum. The exposure device emits a laser beam to expose the photosensitive drum and to form an electrostatic latent image. The developing device supplies toner to form the toner image on the photosensitive drum. The replenishing device replenishes the developing device with the toner. The transferring device transfers the toner image on the photosensitive drum to the sheet S. The cleaning device removes the toner remaining on the photosensitive drum after the transferring. The charge elimination device eliminates electric charge remaining on the photosensitive drum.

The fixing device 30 heats and pressurizes the toner image to fix the toner image on the sheet S. The sheet S on which the toner image is fixed is conveyed by the conveying part 50 to the discharging part 70. The discharging part 70 discharges the sheet S to the outside of the image forming apparatus 100.

The fixing device 30 is installed on the image forming apparatus 100. Hereinafter, with reference to FIG. 2A, FIG. 2B and FIG. 3, the fixing device 30 according to the embodiment will be described.

Figure 2A:
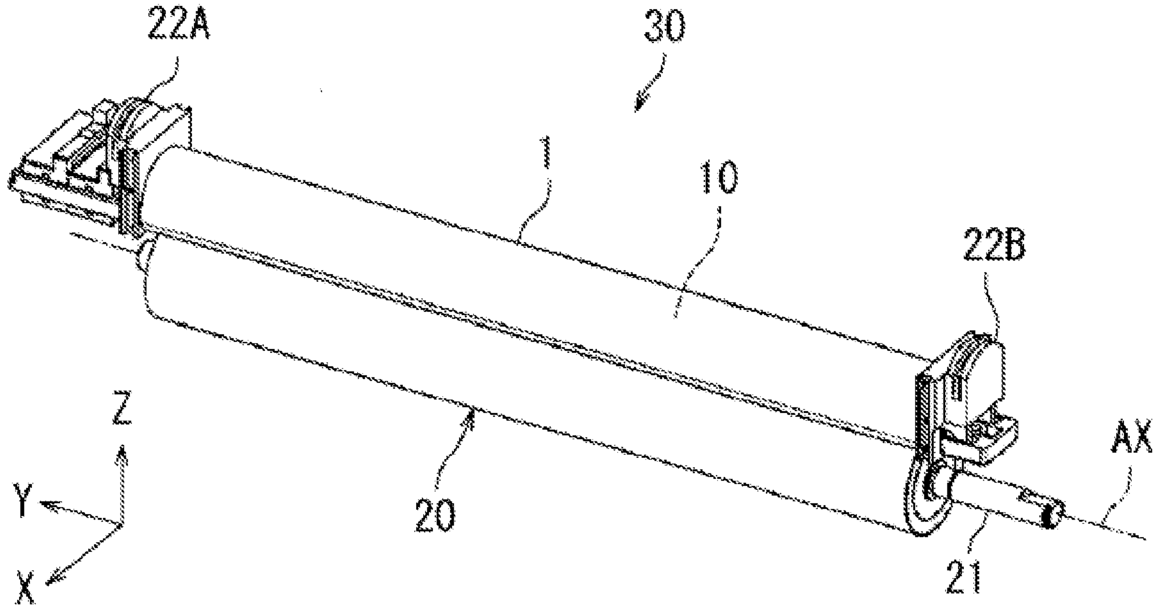
FIG. 2A is a perspective view showing the fixing device according to the embodiment of the present invention.
Figure 2B:
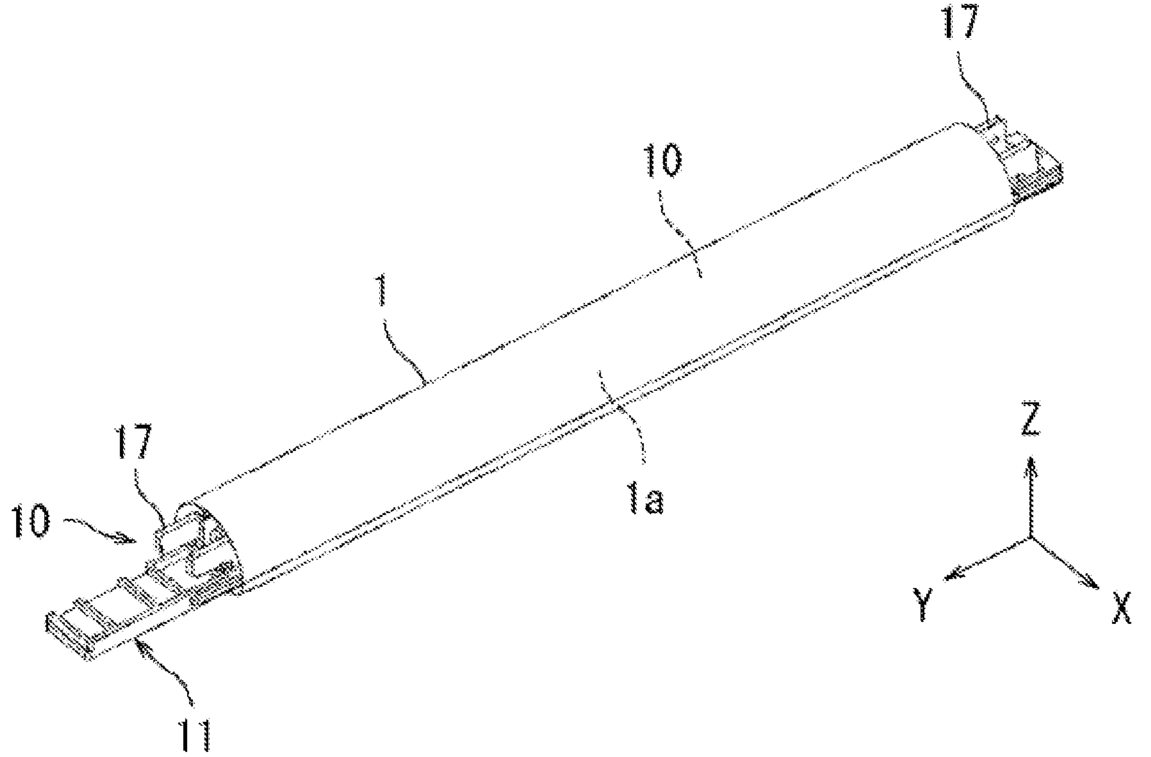
FIG. 2B is a perspective view showing a heating unit of the fixing device according to the embodiment of the present invention.

FIG. 2A is a perspective view showing the fixing device 30 according to the embodiment, and FIG. 2B is a perspective view showing a heating unit 10 of the fixing device 30.

As shown in FIG. 2A and FIG. 2B, the fixing device 30 includes a fixing belt 1, belt holding members 22A and 22B, a pressing roller 20 and a heating unit 10. The heating unit 10 includes a flat heater 11, two temperature sensors 13A and 13B, a heater holder 12 and a sensor holder 15.

The heating unit 10 is disposed in the cylindrical fixing belt 1. The heating unit 10 is an example of a heating part of the present invention. The heater holder 12 is an example of a heater holding member of the present invention, and the sensor holder 15 is an example of a sensor holding member of the present invention.

The pressing roller 20 rotates around the rotational axis Ax, comes into contact with the outer circumferential surface of the fixing belt 1 and presses the fixing belt 1. The pressing roller 20 has a shaft 21 which is a core metal, a release layer provided on the outermost surface (the outer circumferential surface), and a cylindrical elastic layer inside the release layer. In this embodiment, the rotational axis Ax extends along the Y axis direction.

The shaft 21 is a shaft member extending along the rotational axis Ax. The shaft 21 is made of stainless steel or aluminum, for example. The elastic layer is made of silicone rubber, for example. The release layer is made of fluorocarbon resin, for example.

The fixing belt 1 is heated by the heater 11 to fix the toner image on the sheet S. The fixing belt 1 has a substantially cylindrical shape. The fixing belt 1 is an endless belt rotating in the circumferential direction. The fixing belt 1 has a plurality of layers. The fixing belt 1 has a polyimide layer and a release layer, for example. The release layer is a heat-resistant film made of fluorocarbon resin, for example.

Both end portions of the fixing belt 1 in the rotational axis Ax direction (the Y axis direction) is rotatably supported by belt holding members 22A and 22B. Therefore, the fixing belt 1 rotates along the support shape (in this case, a semicircular shape) of the belt holding members 22A and 22B in synchronization with the rotation of the pressing roller 20.

As shown in FIG. 2B, the heating unit 10 is covered with the fixing belt 1. Specifically, the heating unit 10 and the flat heater 11 face the pressing roller 20 across the fixing belt 1. A part of the outer circumferential surface of the fixing belt 1, where faces the pressing roller 20, is a pressing surface 1*a*. In FIG. 2B, the pressing surface 1*a* is a surface hidden under the fixing belt 1.

Between the pressing surface 1*a* of the fixing belt 1 and the pressing roller 20, a nip area which nips the sheet S and applies heat and pressure to the sheet S is formed. When the pressing roller 20 rotates, the fixing belt 1 rotates following the pressing roller 20. When the sheet S passes through the nip area, the toner image is melted and fixed on the sheet S.

Next, with reference to FIG. 3, the structure of the heating unit 10 of the fixing device 30 according to the present embodiment will be described. The heating unit 10 of this embodiment is assembled in a process different from the assembling process of the image forming apparatus 100. After the heating unit 10 is assembled as a unit, as shown in FIG. 2B, the heating unit 10 is inserted into the inside (the inner circumference) of the cylindrical fixing belt 1, and is prepared to be assembled in the image forming apparatus 100.

Figure 3:
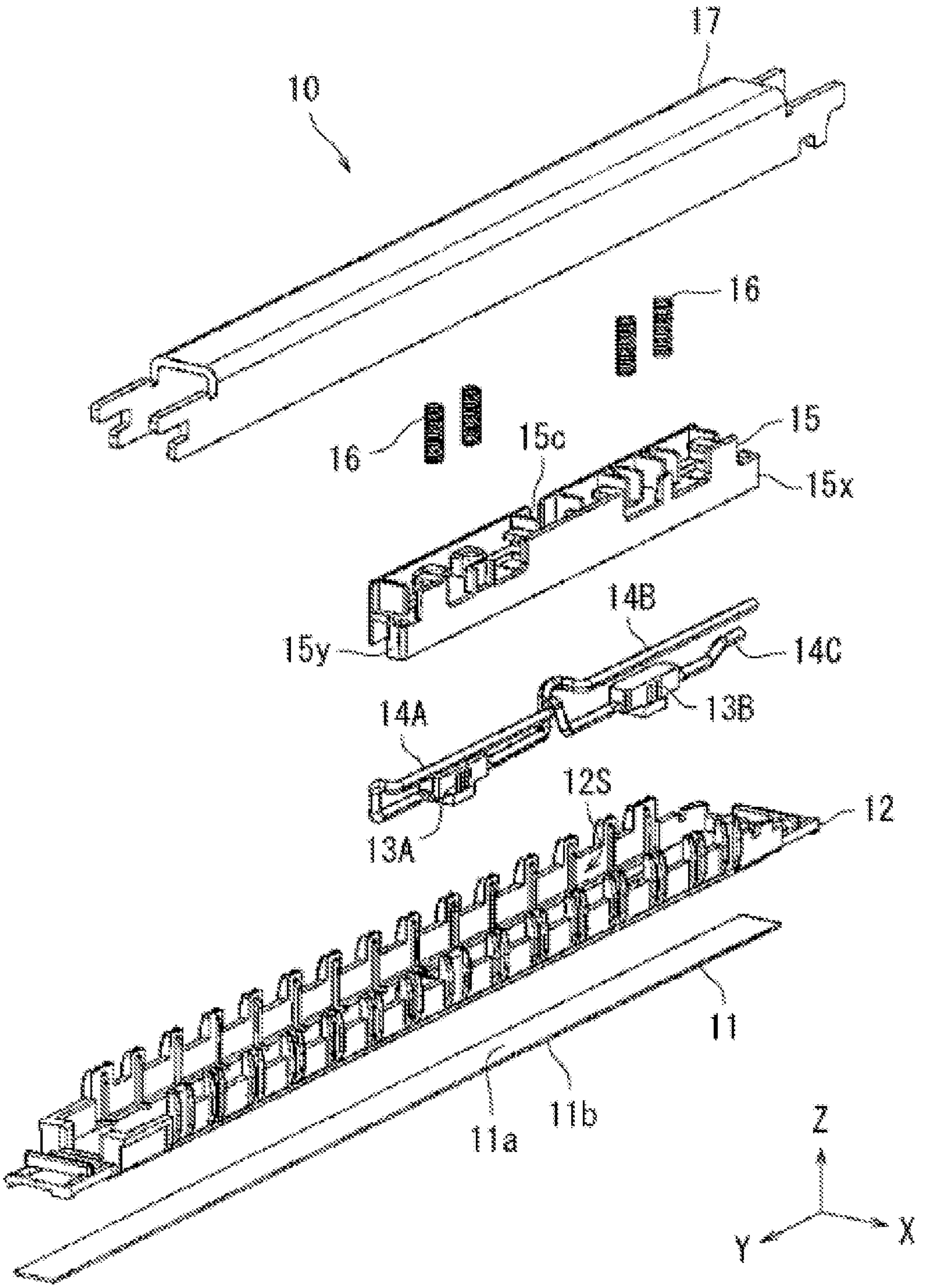
FIG. 3 is a disassembled perspective view showing the heating unit of the fixing device according to the embodiment of the present invention.

FIG. 3 is a disassembled perspective view showing the heating unit 10 of the fixing device 30 of the present embodiment. The heating unit 10 disposed in the inside (the inner circumference) of the fixing belt 1 includes electric wirings 14A, 14B and 14C, four coil springs 16, and a stay 17 in addition to the heater 11, the heater holder 12, the temperature sensors 13A and 13B and the sensor holder 15.

The coil spring 16 is an example of a biasing member in the present invention. The stay 17 is an example of a reinforcing member in the present invention. In FIG. 3, an upper surface of the flat heater 11, where faces the heater holder 12, is a first surface 11*a*, and a lower surface facing the fixing belt 1 (not shown) is a second surface 11*b*.

The heater 11 is a thin and long plate-shaped heating element, for example, and extends in the rotational axis direction of the pressing roller 20 (the Y axis direction). The heater 11 is connected to a power source (not shown) and generates heat to melt and to fix the toner image on the sheet S via the fixing belt 1 on the side of the second surface 11*b*. The heater 11 is a ceramic heater, for example, and includes a ceramic substrate and a plurality of resistance heating elements disposed on the ceramic substrate on the side of the second surface 11*b*. A thickness of the heater 11 is 1 mm, for example.

The heater holder 12 holds the flat heater 11 so as to come into contact with the inner circumferential surface of the cylindrical fixing belt 1. The heater holder 12 faces the fixing belt 1 via the heater 11. In other words, the heater holder 12 presses the heated fixing belt 1 against the sheet S conveyed between the fixing belt 1 and the pressing roller 20, through the heater 11.

The heater holder 12 is made of heat-resistant resin, for example, and extends along the axis (the Y axis) of the pressing roller 20. The heater holder 12 is engaged with the stay 17 that is a reinforcing member.

The temperature sensors 13A and 13B measure a temperature of the heater 11 as a surface temperature of the ceramic substrate. The temperature sensors 13A and 13B are thermistors, for example. The image forming apparatus 100 controls heating by the heater 11 based on the measured temperatures of the temperature sensors 13A and 13B. Since the temperature sensors 13A and 13B are the thermistors, it becomes possible to improve accuracy of controlling the temperature of the heater 11.

The temperature sensors 13A and 13B may be thermocuts or thermostats. In the case of thermocut, when the temperature of the heater 11 exceeds a threshold value, supply of electric power to the heater 11 is blocked. In the case of thermostat, when the temperature of the heater 11 is equal to or higher than a threshold value, supply of electric power to the heater 11 is blocked, and when the temperature falls below the threshold value, the supply of electric power to the heater 11 is restarted.

The electric wirings 14A, 14B and 14C electrically connect between the temperature sensors 13A and 13B or between the temperature sensors 13A and 13B and the image forming apparatus 100. The image forming apparatus 100 includes a temperature controller of the heater 11 or a controller capable of controlling the temperature of the heater 11. The electric wirings 14A, 14B and 14C will be described later.

The sensor holder 15 is disposed between the heater holder 12 and the stay 17, and collectively holds the temperature sensors 13A and 13B at a predetermined position. The sensor holder 15 houses the electric wirings 14A, 14B and 14C in a space-saving and compact manner. The holding of the temperature sensors 13A and 13B will be described later.

The stay 17 suppresses outward deflection of the heater holder 12 to reinforce the pressing of the heater holder 12 to the pressing roller 20. The stay 17 is a thin and long metal stay member, for example.

The stay 17 overlaps with the heater holder 12 along the longitudinal direction (the Y axis direction) of the heater holder 12, and forms a space (hereinafter, a wiring storage space) capable of storing the temperature sensors 13A and 13B, the electric wirings 14A, 14B and 14C, and the others between the stay 17 and the heater holder 12.

The four coil springs 16 are inserted in through holes 15*d* (15*d*1 to 15*d*4) of the sensor holder 15, and disposed between the stay 17 and the heater holder 12. As shown in FIG. 3, the temperature sensors 13A and 13B are placed on predetermined positions of the heater holder 12 on which the coil springs 16 are placed. Thus, substantially, the four coil springs 16 are positioned between the stay 17 and the temperature sensors 13A and 13B. Thereby, each coil spring 16 biases the temperature sensors 13A and 13B toward the heater holder 12 and the heater 11.

Figure 4A:
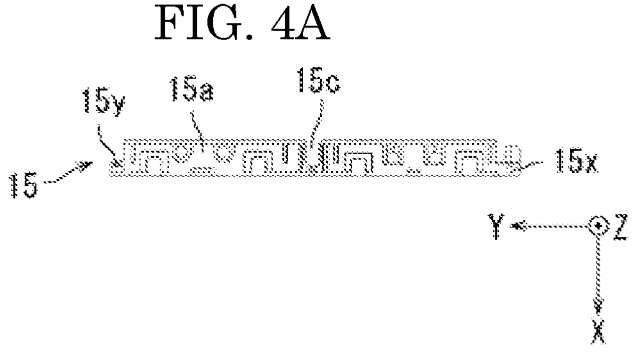
FIG. 4A is a top view showing a sensor holder of the heating unit.
Figure 4B:
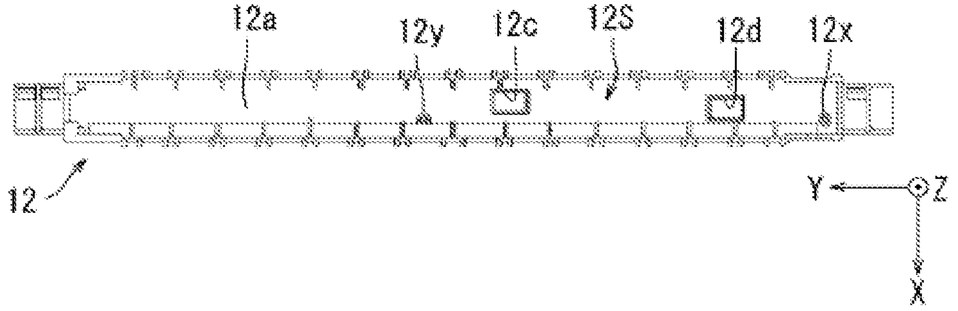
FIG. 4B is a top view showing a heater holder.
Figure 4C:
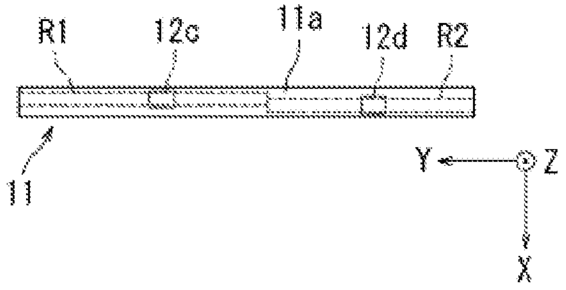
FIG. 4C is a view showing a heater viewed from a heater holder side.

With reference to FIG. 4A to FIG. 4D, a relationship between the arrangement position of the temperature sensors 13A and 13 B, and the heater 11 will be described. FIG. 4A is a top view showing the sensor holder 15, and FIG. 4B is a top view showing the heater holder 12. FIG. 4C is a view showing the flat heater 11 viewed from the upper side (the heater holder 12 side), and FIG. 4 D is a view showing a structure in which the heater holder 12 holds the flat heater 11.

In FIG. 4C, the rectangles drawn by the imaginary lines (the two-dot chain lines) on the resistance heating elements R1 and R2 (indicated by the dot lines) located on the back side (the side of the second surface lib) of the ceramic substrate show portions where the temperature sensing portions of the temperature sensors 13A and 13B come into contact with the first surface 11*a* of the heater 11.

As shown in FIG. 4B, the heater holder 12 forms an upwardly U-shaped sensor storage space 12S. The heater holder 12 has an inner bottom surface 12*a* of the sensor storage space 12S, two observation holes 12*c* and 12*d*, and convex protrusions 12*x* and 12*y*. The protrusions 12*x* and 12*y* are an example of a guide part of the present invention.

Figure 4D:
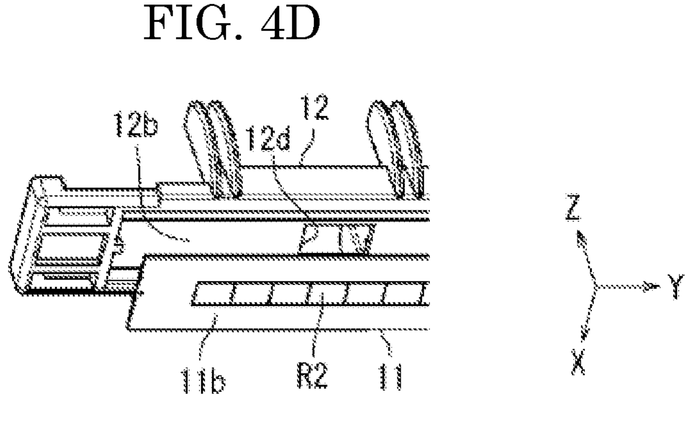
FIG. 4D is a view showing a structure in which the heater holder holds the heater.

As shown in FIG. 4D, the heater holder 12 has an outer bottom surface 12*b* which holds the heater 11, on the back side of the inner bottom surface 12*a*. The observation holes 12*c* and 12*d* are rectangular openings penetrating from the inner bottom surface 12*a* of the sensor storage space 12S toward the outer bottom surface 12*b*. The observation holes 12*c* and 12*d* expose the upper surface (the first surface 11*a*) of the heater 11 to the inside of the sensor storage space 12S in a state where the heater holder 12 holds the heater 11.

As shown in FIG. 4B, the observation holes 12*c* and 12*d* are offset with respect to the center line along the axial direction of the heater holder 12 indicated by the one-dot chain line in the drawing in the direction perpendicular to the center line. This is because the resistance heating elements R1 and R2 disposed on the lower surface (the second surface 11*a*) of the heater 11 are displaced with respect to the center line of the heater holder 12.

In other words, the offset arrangement of the observation holes 12*c* and 12*d* corresponds to the displacement of the resistance heating elements R1 and R2 as shown in FIG. 4C. With this configuration, the temperature sensing portions (the probe portions) of the temperature sensors 13A and 13B placed on the observation holes 12*c* and 12 can come into contact with positions corresponding to just backsides of the resistance heating elements R1 and R2 when they are inserted into the observation holes 12*c* and 12*d*. As a result, each of the temperature sensors 13A and 13B can measure the temperature of each of the resistance heating elements R1 and R2 individually and accurately.

Next, as shown in FIG. 4 B, the protrusions 12*x* and 12*y* serving as the guide part have a cylindrical or conical shape protruding upward from the inner bottom surface 12*a* of the sensor storage space 12S. The protrusions 12*x* and 12*y* are engaged with engagement parts 15*x* and 15*x* on the sensor holder 15 side.

The engagement parts 15*x* and 15*y* of the sensor holder 15 have a through hole shape as shown in FIG. 4A, and are formed in a round hole or an elongated hole. The engagement parts 15*x* and 15*y* are fitted to the protrusions 12*x* and 12*y* of the heater holder 12, respectively.

Figure 5A:
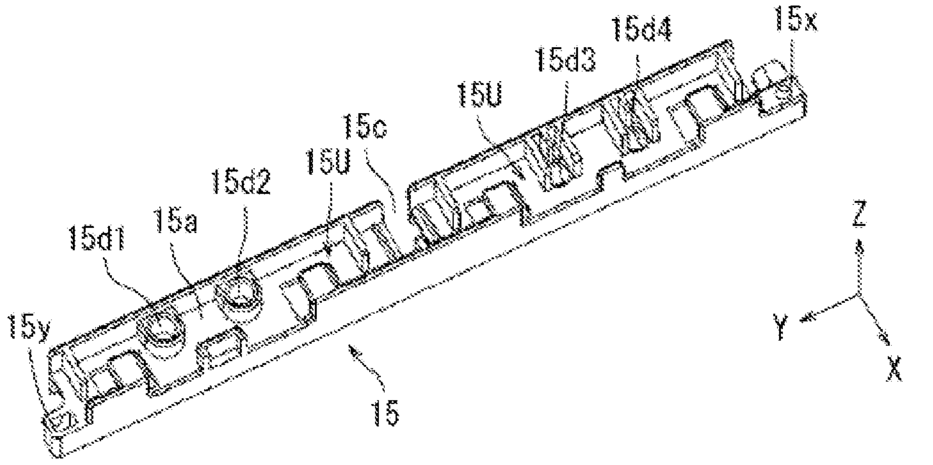
FIG. 5A is a perspective view showing the sensor holder of the heating unit.
Figure 5B:
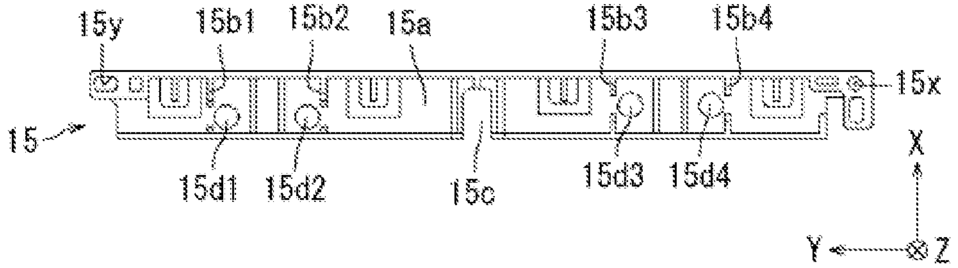
FIG. 5B is a bottom view showing the sensor holder.

Next, with reference to FIG. 5A to FIG. 5C, the arrangement position of the temperature sensors 13A and 13B and the structure for biasing the temperature sensors 13A and 13B will be described. FIG. 5A is a perspective view showing the sensor holder 15, FIG. 5B is a bottom view showing the sensor holder 15, and FIG. 5C is a sectional view showing the electric wirings stored in the sensor holder 15 of the heating unit 10.

Figure 5C:
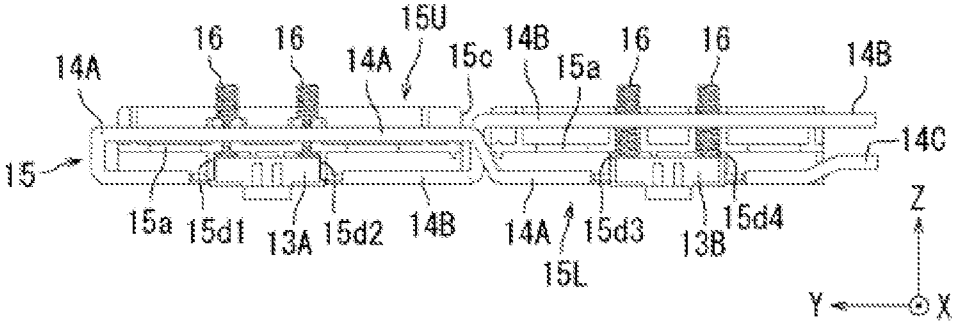
FIG. 5C is a view showing an electric wiring stored in the sensor holder of the heating unit.

As shown in FIG. 5C, each of the temperature sensors 13A and 13B is assembled into the sensor holder 15 in a state of functioning as a sensor by adding a wire, a biasing member and the others, and is assembled into a predetermined position between the heater holder 12 and the stay 17 in that state.

As a result, the temperature sensing portions of the temperature sensors 13A and 13B are brought into contact with the first surface 11*a* of the flat heater 11 through the observation holes 12*c* and 12*d* of the heater holder 12, and can measure the temperatures of the resistance heating elements R1 and R2 constituting the heater 11 individually.

The structure of the sensor holder 15 will be described. The sensor holder 15 shown in FIG. 5A and FIG. 5B holds the two temperature sensors 13A and 13B. The engagement parts 15*x* and 15*y* engaging with the protrusions 12*x* and 12*y* are formed at both end portions of the sensor holder 15 in the axial direction (the Y axis direction). By engagement of the engagement parts 15*x* and 15*y* with the protrusions 12*x* and 12*y*, accurate positioning becomes possible.

The detailed structure of the sensor holder 15 will be described. The sensor holder 15 as a whole has a two-layer structure having a lower wiring space 15L in which the temperature sensors 13A and 13B and the electric wirings 14A, 14B and 14C are stored, on the lower side, and an upper wiring space 15U in which the electric wirings 14A and 14B are stored, on the upper side.

As shown in FIG. 5A to FIG. 5C, the sensor holder 15 has a partition plate portion 15*a*, a first sensor holding portion 15*b*1 to a fourth sensor holding portion 15*b*4, a notch 15*c*, and the first through hole 15*d*1 to the fourth through hole 15*d*4 between the engagement part 15*x* and 15*y* at both ends in the axial direction (the longitudinal direction).

The partition plate portion 15*a* is formed in a plate-like shape extending in the longitudinal direction (the Y axis direction), and partitions the upper wiring space 15U and the lower wiring space 15L in the upper-and-lower direction.

The four sensor holding portions 15*b*1 to 15*b*4 are formed in a wall-like shape extending in a direction (the X axis direction) perpendicular to the longitudinal direction. The temperature sensors 13A and 13B are held between the first sensor holding portion 15*b*1 and the second sensor holding portion 15*b*2, and between the third sensor holding portion 15*b*3 and the fourth sensor holding portion 15*b*4.

As shown in FIG. 5B, the walls constituting the sensor holding portions 15*b*1 to 15*b*4 have notches through which leads (terminals) protruding from the temperature sensors 13A and 13B in the longitudinal direction (the Y axis direction) can be passed.

Further, as shown in FIG. 5C, the temperature sensors 13A and 13B are held in a state where the temperature sensing portions protrude downward from the sensor holder 15 so that the temperature sensing portion can be brought into contact with the flat heater 11. Further, the temperature sensor 13A (on the left side in the drawing) and the temperature sensor 13B (on the right side in the drawing) are arranged so that the polarity of the leads (the terminals) is reversed.

The notch 15*c* is disposed in the center portion of the partition plate portion 15*a* in the longitudinal direction (the X axis direction) between the left and right temperature sensors 13A and 13B. In order to quickly assemble the electric wirings 14A, 14B and 14C connected to the temperature sensors 13A and 13B into the sensor holder 15, the notch 15*c* is not formed in a hole-like shape (a through hole shape), but is formed in a notch opened in the X axis direction.

The four through holes 15*d*1 to 15*d*4 through which the four coil springs 16 are passed are provided in such a way that two of them are disposed at a predetermined interval between the first sensor holding part 15*b*1 and the second sensor holding part 15*b*2 and the other two of them are disposed at a predetermined interval between the third sensor holding part 15*b*3 and the fourth sensor holding part 15*b*4.

As shown in FIG. 5C, the through holes 15*d*1 and 15*d*2 are disposed in a pair on both sides of the temperature sensing portion of the temperature sensor 13A in the Y axis direction. The through holes 15*d*3 and 15*d*4 are disposed in a pair on both sides of the temperature sensing portion of the temperature sensor 13B in the Y axis direction.

Therefore, the temperature sensing portions of the temperature sensors 13A and 13B can be uniformly pressed on one surface (the first surface 11*a*) of the heater 11 with uniform pressure when they are assembled between the heater holder 12 and the stay 17.

The engagement parts 15*x* and 15*y* of the sensor holder 15 engaging with the protrusions 12*x* and 12*y* are preferably round or oblong through holes. In particular, it is preferable that one engagement part 15*x* is formed as a round hole and the other engagement part 15*y* is formed as an oblong hole because it becomes possible to satisfy both accuracy of positioning and easiness of fitting them to the guide part of the heater holder 12. In addition, the elongated holes allow shape errors or the like of the protrusions 12*x* and 12*y*.

Here, the assembling of the temperature sensors 13A and 13B and the electric wirings 14A to 14C connecting them into the sensor holder 15 will be described.

First, the temperature sensors 13A and 13B and the electric wirings 14A to 14C are prepared in a connected state in a process different from the heating unit 10. When the leads of the temperature sensors 13A and 13B are connected to the respective electric wirings 14A to 14C by an automatic machine, a space (excess electric wirings) of several cm or more is required between the temperature sensor 13A and the temperature sensor 13B due to process limitations such as handling of the members and chucking.

As described above, even when there is the excess electric wiring between the temperature sensor 13A and the temperature sensor 13B, the sensor holder 15 of the heating unit 10 of this embodiment can easily and compactly store the electric wiring 14A to 14C in the holding member, as shown in FIG. 5C.

For example, in the example of FIG. 5C, the left temperature sensor 13A is first fitted between the predetermined first sensor holding portion 15*b*1 and second sensor holding portion 15*b*2, and the left electric wiring 14A is disposed in the upper wiring space 15U from the lower wiring space 15L, and the right electric wiring 14B is disposed in the lower wiring space 15L.

Next, the upper electric wiring 14A and the lower electric wiring 14B are fitted into the notch 15*c* from the lateral side of the sensor holder 15 such that they cross each other at the notch 15*c* in the upper-and-lower direction.

Next, the left temperature sensor 13B is fitted into the predetermined position between the third sensor holding portion 15*b*3 and the fourth sensor holding portion 15*b*4, and the upper electric wiring 14A is drawn out from one end of the sensor holder 15 as it is, and the lower electric wiring 14C connected to the lead of the temperature sensor 13B is drawn out from the same end.

Then, by using the sensor holder 15 prepared such that the temperature sensors 13A and 13B and the electric wirings 14A to 14C are assembled, the engagement part 15*x* of the sensor holder 15 is fitted to the protrusion 12*x* of the heater holder 12, and the engagement part 15*y* of the sensor holder 15 is fitted to the protrusion 12*y* of the heater holder 12. As a result, the arrangement and positioning of the plurality of temperature sensors in the heater holder 12 are completed.

In this manner, in the fixing device 30 of the present embodiment, the temperature sensors 13A and 13B can be collectively positioned at one time. In addition, the temperature sensors 13A and 13B can be assembled into the heating unit 10 in one work to easily construct the fixing device 30.

Therefore, in the fixing device 30 of this embodiment, even in the case where one temperature sensor must be installed for each heater, the increase in the number of parts and the number of work steps can be suppressed, and the increase in the total cost of the fixing device 30 and the image forming apparatus 100 provided with the fixing device can be suppressed.

As described above, embodiments of the present invention have been described with reference to the drawings. However, the present invention is not limited to the above-described embodiments, and can be implemented in various modes without departing from the gist thereof. For example, some components may be removed from all components shown in the embodiments. The drawings schematically show the respective components mainly for the purpose of easy understanding, and the thickness, length, number, spacing, etc. of the illustrated components are different from the actual ones for the convenience of drawing preparation. Further, the materials, shapes, dimensions, etc. of the respective components shown in the above embodiments are only examples, and are not particularly limited, and various changes are possible within a range not substantially deviating from the structure of the present invention.

Although the image forming apparatus 100 is a monochrome multifunctional peripheral, the present invention is not limited thereto. The image forming apparatus 100 only needs to be an electrophotographic system. For example, the image forming apparatus 100 may be a color multifunctional peripheral.

The type and number of temperature sensors and the type and number of heaters held by the sensor holding member (the sensor holder) of the fixing device of the present invention are not limited to the examples in the embodiments. As the number of heaters and temperature sensors for measuring the temperature of each heater increases, the increase of the number of parts and the number of work steps are suppressed, and the effect of suppressing the increase of the total cost can be more received.

In the embodiment described with reference to FIG. 1 to FIG. 5C, the biasing member for biasing the temperature sensors 13A and 13B is the coil spring 16, but the biasing member is not limited thereto. As the biasing member, another elastic member such as a leaf spring may be used. In addition, the number of biasing members to be provided may be any number as long as it is a plurality (two or more).

Further, the positioning guide part formed on the heater holding member and the engagement part of the sensor holding member engaged with the guide part are not limited to the shape shown in the embodiments described in FIG. 1 to FIG. 5C. For example, the protrusions 12*x* and 12*y* of the heater holder 12 may be not only cylindrical or conical but also a hone-shape if they are convex. The hole shapes of the engagement parts 15*x* and 15*y* on the sensor holder 15 side can be suitably changed in accordance with the outer circumferential shapes of the protrusions 12*x* and 12*y*.

The present invention can be used in the field of fixing devices and the image forming apparatus.

The invention claimed is:

1. A fixing device comprising:
a fixing belt having a pressing surface;
a pressing roller coming into contact with the pressing surface; and
a heating part which heats the fixing belt, wherein
the heating part includes:
a heater extending in an axial direction of the pressing roller;
a plurality of temperature sensors;
a heater holding member which holds the heater so as to come into contact with a backside of the pressing surface of the fixing belt; and
a sensor holding member which holds the temperature sensors at intervals in the axial direction between the heater holding member and the sensor holding member, wherein
the heater has a first surface facing the heater holding member,
the heater holding member has observation holes which are disposed at a plurality of positions separate from each other in the axial direction and through which the first surface of the heater is exposed,
the heater holding member has a guide part which positions the sensor holding member with respect to the heater holding member,
the sensor holding member has an engagement part engaged with the guide part,
the sensor holding member holds each of the temperature sensors at a position corresponding to each of the observation holes by engagement of the engagement part with the guide part,
the heating part includes a first electric wiring and a second electric wiring which are connected to the temperature sensors,
the sensor holding member is provided with a wiring storage space in which the first electric wiring and the second electric wiring are stored,
the sensor holding member includes:
a partition wall portion partitioning the wiring storage space into an upper electric wiring storage space and a lower electric wiring storage space; and a notch through which the first electric wiring and the second electric wiring are passed, the first electric wiring has a portion stored in the upper electric wiring storage space, a portion stored in the lower electric wiring storage space and a portion passed through the notch, and the second electric wiring has a portion stored in the lower electric wiring storage space, a portion stored in the upper electric wiring storage space and a portion passed through the notch.

2. The fixing device according to claim 1, wherein in a state where the engagement part is engaged with the guide part, each of temperature sensing portions of the temperature sensors comes into contact with the first surface of the heater through each of the observation holes.

3. The fixing device according to claim 1, wherein the heating part includes:

a reinforcing member which receives pressing force applied to the heater and the heater holding member from the pressing roller; and a biasing member which biases the temperature sensors, wherein the sensor holding member has a through hole through which the biasing member is passed in a direction perpendicular to the axial direction, and the biasing member is passed through the through hole, and disposed between the temperature sensor and the reinforcing member.

4. The fixing device according to claim 3, wherein a plurality of the biasing members are provided for each of the temperature sensors.

5. The fixing device according to claim 1, wherein the heater has:

a second surface facing the fixing belt; and a plurality of resistance heating elements extending in the axial direction, and the plurality of resistance heating elements are disposed on the second surface.

6. The fixing device according to claim 1, wherein the guide part is a protrusion, and the engagement part is a hole into which the protrusion is fitted.

7. The fixing device according to claim 1, wherein the temperature sensors are disposed such that leads protruding from longitudinally end portions of the temperature sensor are along the axial direction, and the sensor holding member has notches through which the leads can be passed.

8. An image forming apparatus comprising:

the fixing device according to claim 1; and an image forming part which forms a toner image on a sheet, wherein the fixing device fixes the toner image on the sheet.

* * * * *